United States Patent
Liitola et al.

(10) Patent No.: US 7,672,809 B2
(45) Date of Patent: Mar. 2, 2010

(54) OBJECT TRACKER

(75) Inventors: Toni Liitola, Tampere (FI); Tapani Ritoniemi, Tampere (FI); Sami Kiiskilä, Tampere (FI)

(73) Assignee: VLSI Solution Oy, Tampere (FI)

( * ) Notice: Subject to any disclaimer, the term of this patent is extended or adjusted under 35 U.S.C. 154(b) by 0 days.

(21) Appl. No.: 11/822,036

(22) Filed: Jul. 2, 2007

(65) Prior Publication Data

US 2008/0071495 A1 Mar. 20, 2008

(30) Foreign Application Priority Data

Sep. 15, 2006 (EP) .................................. 06120793

(51) Int. Cl.
*G01C 9/00* (2006.01)
(52) U.S. Cl. ...................... 702/153; 702/150
(58) Field of Classification Search ................. 702/150, 702/153
See application file for complete search history.

(56) References Cited

U.S. PATENT DOCUMENTS

| | | | | |
|---|---|---|---|---|
| 4,807,202 | A * | 2/1989 | Cherri et al. ................ | 367/129 |
| 5,107,746 | A | 4/1992 | Bauer | |
| 5,487,306 | A | 1/1996 | Fortes | |
| 5,495,427 | A * | 2/1996 | Puma et al. ................. | 367/117 |
| 5,528,232 | A * | 6/1996 | Verma et al. ........... | 340/825.49 |
| 6,556,942 | B1 * | 4/2003 | Smith ......................... | 702/150 |
| 7,236,880 | B2 * | 6/2007 | Fager et al. ................. | 701/209 |
| 2003/0060163 | A1 * | 3/2003 | Filkins et al. .............. | 455/67.1 |
| 2006/0291667 | A1 * | 12/2006 | Watanabe et al. ............. | 381/77 |

FOREIGN PATENT DOCUMENTS

| | | |
|---|---|---|
| DE | 2716345 A1 | 10/1978 |
| WO | WO-99/53838 A1 | 10/1999 |

OTHER PUBLICATIONS

Hidetoshi Nonaka et al; Ultrasonic Position Measurement and Its Applications to Human Interface; IEEE Transactions on Instrumentation and Measurement 44(Jun. 1995), No. 3, New York, US; pp. 771-774.
Tatsuo Arai et al.; Development of the measuring Equipment for Location and Direction (MELODI) Using Ultrasonic Waves and Its Evaluation; Oct. 1982; pp. 1013-1020.
European Search Report—Dec. 6, 2006.

* cited by examiner

*Primary Examiner*—Bryan Bui
*Assistant Examiner*—Jonathan Teixeira Moffat
(74) *Attorney, Agent, or Firm*—Venable LLP; Eric J. Franklin (57) ABSTRACT

Object tracking using ultrasonic signals. A receiver receives a signal transmitted from a transmitter. The receiver uses at least two receiving elements for forming at least two analysis signals on the basis of the received signal. The receiver includes a detector, such as a phase detector, which examines the analysis signals and forms an indication on a difference between the analysis signals. The indication is, for example, indicative of a phase difference between the analysis signals. The transmitted signal is a modulated ultrasonic signal, wherein the receiver demodulates the signal to recover the modulating signal. The indication can be used to determine a heading angle information of the object to be tracked. The heading angle information may be a direction of the object with respect to the transmitter. The heading angle information can be used to make e.g. a corrective action to audio signals to be formed for listening.

19 Claims, 5 Drawing Sheets

OBJECT TRACKER

CROSS-REFERENCE TO RELATED APPLICATIONS

This application claims priority to European patent application 06120793.2 filed 15 Dec. 2006.

FIELD OF THE INVENTION

The present invention relates to a receiver for receiving a signal from a transmitter to form an analysis signal on the basis of the received signal, and for analysing said analysis signal to determine the heading angle of an object. The invention also relates to an object tracking device comprising a receiver for receiving a signal from a transmitter to form an analysis signal on the basis of the received signal; and an analysing element for analysing said analysis signal to determine the heading angle of the object. The invention relates to a system comprising a transmitter for transmitting a signal; a receiver for receiving the signal transmitted from the transmitter to form an analysis signal on the basis of the received signal; and an analysing element for analysing said analysis signal to determine the heading angle of an object. The invention further relates to a method for tracking an object comprising transmitting a signal from a transmitter; receiving said signal; forming an analysis signal on the basis of the received signal; and analysing said analysis signal to determine the heading angle of the object.

BACKGROUND OF THE INVENTION

In some applications it is desired to determine a heading angle of an object i.e. a direction of an object with respect to a reference point. Typically the heading angle of the object should be determined with respect to a certain point in a vicinity of the object. Further, movements of the object should also be detected to perform certain actions on the basis of detected heading angle and/or movements of the object. Some of such applications relate to generating audio signals for a person so that the heading angle and movements of the person's head are taken into consideration when the audio signals are generated. The person may use a headset to listen audio signals, e.g. music, sounds of a TV program, a movie, a game, etc. Typically this kind of listening experiences take place in a room so that visual effects are shown on TV, on a computer display, on a screen, on one or more walls of a room (like in a cinema), etc. Such visual effects may include a video, a movie, a TV program, actions of an electronic game, still images, actions of a computer program, etc. It is obvious that the above mentioned examples are not restrictive but also other visual and audio information may be formed by applications in which there is a need to determine a heading angle of an object.

The determination of the heading angle can be performed in one direction or in two directions. The one-directional determination of the heading angle can be performed e.g. in a horizontal or in a vertical direction. The determination in a horizontal direction defines the horizontal angle which is usually called as azimuth. Respectively, the determination in a vertical direction defines the vertical angle which is usually called as elevation.

If the heading angle of an object, for example a person's head, is not determined, the audio signals may not sound natural when the person moves her/his head. For example, when the person is watching a movie on a screen and uses a headset to listen to the audio signals relating to the movie, the person's head should stay in a certain heading angle with respect to the screen to reproduce sounds in such a way that the person could differentiate and locate the origin of different sounds on the screen. In other words, to be able to experience the sound of the movie as natural as possible, the heading angle of the person's head should not affect to the listening experience.

Systems for tracking a heading angle of an object, such as a person's head, have been developed These solutions are usually based on transmission and reception of ultrasonic or optical signals, or they are based on inertia sensors. Also hybrid systems have been developed in which two or more different techniques are combined. In ultrasonic and optical systems signals are generated by one ore more transmitters and received by one or more receivers. For example, in the patent U.S. Pat. No. 5,107,746 three ultrasonic transmitters transmit ultrasonic signals which are received by a receiver attached with or carried by the object to be tracked. Transmitters are at fixed positions which are known to the receiver. The receiver detects differences in time-of-travel of signals from the transmitters and calculates the position of the object by using triangulation. Each transmitter transmit similar kind of pulses. Therefore, the receiver should know which the transmitter transmitted a pulse signal. In the system of U.S. Pat. No. 5,107,746 this is achieved by stagging the transmission of signals from the transmitters. Therefore, only one transmitter should transmit the signal at a time. These kind of prior art systems have certain problems. For example, more than one transmitters are needed to make the triangulation possible. Further, due to the stagging principle the transmission of the transmitters need to be synchronized with each other to avoid overlapping transmissions. The triangulation based location solution requires that the position of the transmitters is known.

In optical systems there should be a direct line-of-sight between a transmitter and a receiver or the tracking will be interrupted or becomes totally impossible. Systems based on coherent detection of a waveform (optical, acoustical, or radio signals) are sensitive to disturbances and other sources of error. The effect of errors are cumulative thus causing an increasing offset to tracking information.

SUMMARY OF THE INVENTION

The present invention is a new object tracking principle based on signal transmission and reception. The basic idea behind the invention is the use of a modulated ultrasonic signal transmitter by a transmitter and to form an indication on differences on a plurality of signals formed by a plurality of receivers which receive the transmitted signal.

According to a first aspect of the present invention there is provided a receiver for receiving a modulated signal from a transmitter to form an analysis signal on the basis of the received signal; the receiver comprising:

a first receiving element for receiving the modulated signal from a transmitter to form a first analysis signal on the basis of the received signal;
   a second receiving element for receiving the modulated signal from the transmitter to form a second analysis signal on the basis of the received signal;
   a detector for providing an indication on the basis of a difference between said first and second analysis signals; and
   an analysing element for analysing said indication to determine the heading angle of an object.

According to a second aspect of the present invention there is provided an object tracking device comprising:

a first receiving element for receiving a modulated signal from a transmitter to form a first analysis signal on the basis of the received signal;

a second receiving element for receiving the modulated signal from the transmitter to form a second analysis signal on the basis of the received signal;

a detector for providing an indication on the basis of a difference between said first and second analysis signals; and an analysing element for analysing said indication to determine the heading angle of the object.

According to a third aspect of the present invention there is provided a system comprising:

a transmitter for transmitting a modulated signal;

a receiver for receiving the modulated signal transmitted from the transmitter to form an analysis signal on the basis of the received signal; and an analysing element for analysing said first and second analysis signals to determine the heading angle of an object, wherein said receiver comprises:

a first receiving element for receiving a signal from a transmitter to form a first analysis signal on the basis of the received signal;

a second receiving element for receiving the signal from the transmitter to form a second analysis signal on the basis of the received signal; and a detector for providing an indication on the basis of a difference between said first and second analysis signals;

and said analysing element is configured to use said indication in the analysis to determine the heading angle of the object.

According to a fourth aspect of the present invention there is provided a method for tracking an object comprising:

transmitting a modulated signal from a transmitter;

receiving said modulated signal;

forming a first analysis signal on the basis of the received signal;

forming a second analysis signal on the basis of the received signal;

examining said first and second analysis signals to provide an indication on the basis of a difference between said first and second analysis signals; and analysing said indication to determine the heading angle of the object.

The invention provides advantages compared to prior art object tracking systems and methods. By using the present invention the latency (delays in detection) can be kept reasonably low and still achieve accuracy good enough for many applications. The invention does not suffer from cumulative errors which may occur in systems using coherent detection. An erroneous detection does not make the system unusable but the system can recover quite fast from errors i.e. the system is robust to errors. The carrier frequency and the modulating frequency can be selected from a quite large range assuming that the modulating frequency is much smaller than the carrier frequency. Preferably, the modulating frequency is one or more decades smaller compared to the carrier frequency. Further, there is no need to transmit any other information from the transmitter than the modulated ultrasonic signal. The invention can be used to make a raw estimate on the direction of the object (acquisition) and to track the object i.e. follow the movements in one or more directions.

DESCRIPTION OF THE DRAWINGS

In the following the invention will be described in more detail with reference to the appended drawings, in which FIGS. 3a-3c illustrate the principle of detecting differences in received signals.

DETAILED DESCRIPTION OF THE INVENTION

Figure 1:
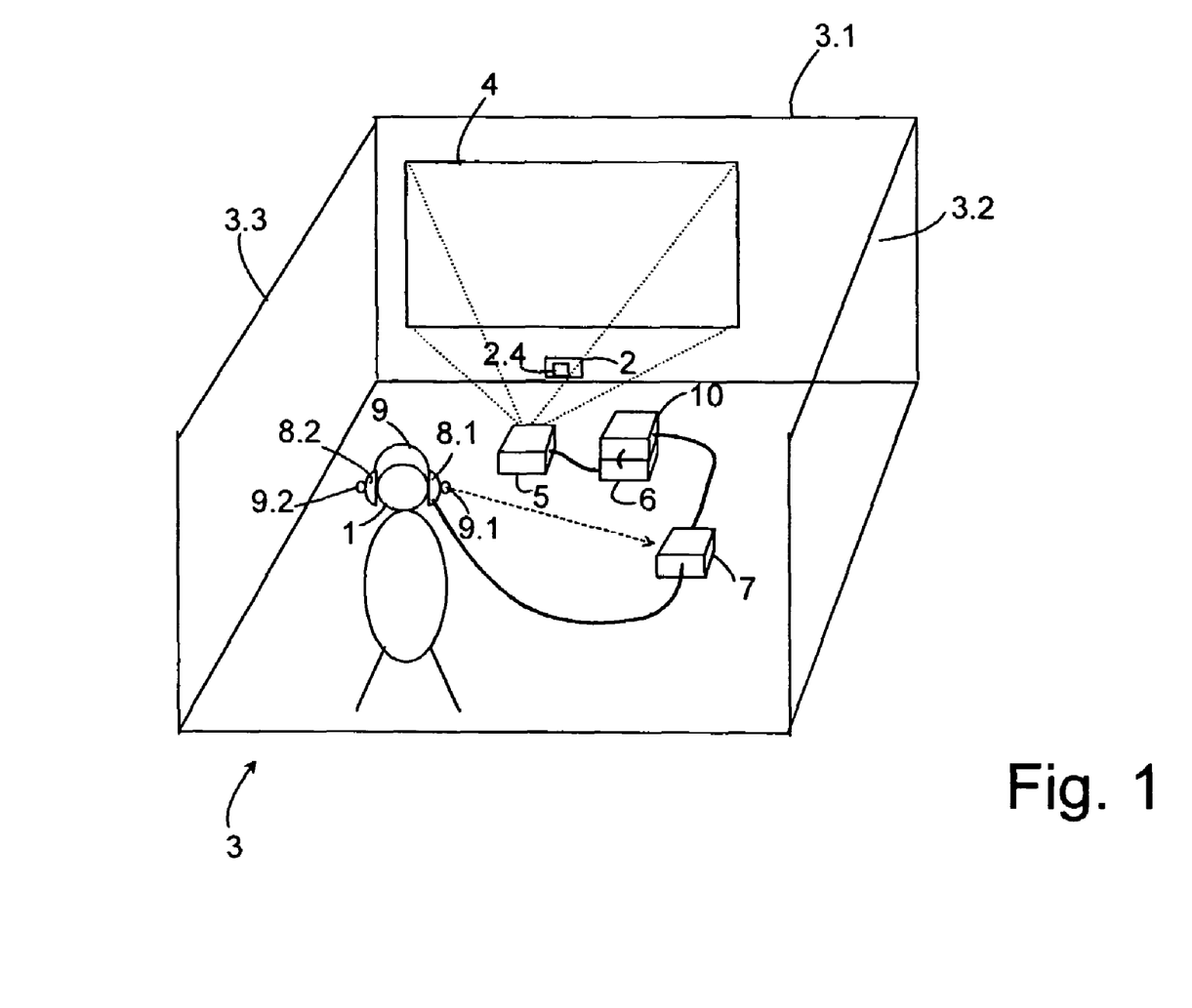
FIG. 1 depicts an example situation in which the location of an object need to be tracked.

FIG. 1 illustrates an example situation in which the an object 1 will be tracked. The object 1 in this example is a person's head but it is obvious that also other object may be tracked by using the present invention. The term tracking means here determination of the heading angle of an object 1 and, when necessary, determination of movements of the object 1. The tracking of the object may include determination of the direction of the object with respect to a certain point, such as a transmitter 2. In some circumstances the tracking of the object 1 may also include determination of inclination (tilt, elevation angle) of the object with respect to a horizontal plane. In other words, the determination of the direction of the object 1 is usually one-dimensional determination of the horizontal or vertical rotation angle of the object 1 with respect to a certain point, or two- dimensional determination of both the horizontal and vertical heading angle of the object 1. The determination of movements of the object may include determination of changes in one or more heading angles of the object. It may also include determination of the position of the object and/or changes in the position of the object with respect to a certain point. The above mentioned tracking principles will be described in more detail later in this application.

In the example situation of FIG. 1 a transmitting element 2.4 of a transmitter 2 is located near a first wall 3.1 of a room 3. In this example the room also comprises other walls such as the second wall 3.2 and the third wall 3.3 but the number of walls is not relevant to the implementation of the invention. The first wall 3.1 is used to project visual signal(s) generated in a visual signal generating apparatus 5, such as a video projector, a movie projector, etc. The visual signal may relate to a TV program, a video, a computer application, a movie, a camera etc. Therefore, the visual signal generating apparatus 5 can receive information from an external device 6 to be shown on the first wall 3.1, or the information may be generated in the visual signal generating apparatus 5. It should be mentioned here that in practice, there is usually a screen 4 on the wall 3.1 onto which the visual signal will be projected, or there is a display (e.g. a computer monitor or a TV) on the wall or on some other location of the room to display visual information. In the following, the term screen will be used as a general term to describe an object or device on or by which visual information can be shown.

It is obvious that the location of the transmitting element 2.4 can be different from the above mentioned proximity of the screen. If the location of the transmitting element 2.4 with respect to a reference point or reference line, such as a centre of the screen 4, is known, a controlling element 7 can perform corrective actions to determine the actual direction of the object 1 with respect to the reference point, when the controlling element 7 knows the direction of the object 1 with respect to the transmitting element 2.4.

The person 1 is carrying a receiving device 9, such as a headset 8 which comprises two or more electro-acoustic transformers 8.1, 8.2, such as loudspeakers or earpieces to generate audible signals to the person's ears from audio signals generated by an audio processing device 7. The audio processing device 7 receives audio information from an audio source 10, which may be part of the external device 6 or implemented in the visual signal generating apparatus 5. Audio information transmitted from the audio source 10 to the audio processing device 9 usually relate to the visual signal generated by the visual signal generating apparatus 5. For example, when the visual signal is visual information of a movie, the audio signal in audio information of the movie. The audio processing device 7 receives also a control signal from the receiving device 9.

The receiving device 9 also comprises a first receiving element 9.1 and a second receiving element 9.2 for receiving ultrasonic signals transmitted from the transmitter 2. The first receiving element 9.1 is positioned on one side of the object 1 to be tracked and the second receiving element 9.2 is positioned on another side of the object 1 to be tracked. Preferably, the first receiving element 9.1 and the second receiving element 9.2 are positioned on opposite sides of the object. For example, the first receiving element 9.1 is fixed near the first acoustic transformer 8.1 of the receiving device 9 and second receiving element 9.2 is fixed near the second acoustic transformer 8.2 of the receiving device 9. However, it is obvious that elements of the receiving 9 need not be fixed to the headset but they can also be formed as a separate device.

Figure 4:
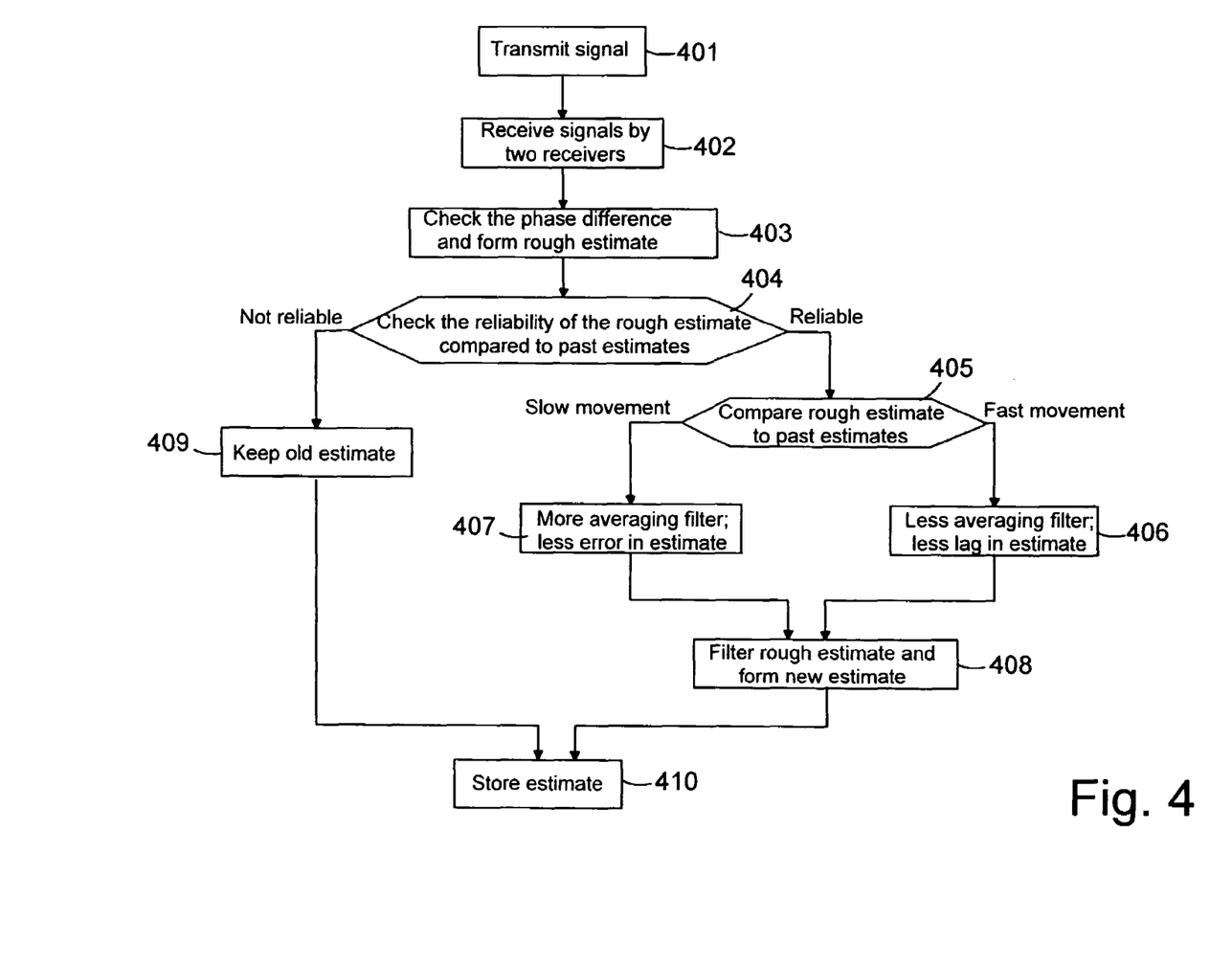
FIG. 4 depicts a method according to an example embodiment of the present invention as a simplified flow diagram

Next, the operation of a method according to an example embodiment of the present invention in a system of FIG. 2 will be described in more detail with reference to the flow diagram of FIG. 4. It is assumed here that audiovisual information will be generated for the person 1 to look at and to listen to. In other words, the person 1 is looking at visual information and listening to audio signals relating to the visual information. For example, the person is watching a movie having sounds recorded therewith. The audio signal can be monophonic, stereophonic or multi-channel audio signal. The multi-channel audio signal is also known as surround sound. Typically, when the audio signal it at least stereophonic (two-channel audio), sources of different sounds can usually be determined at least in course accuracy. As an example, when a car is travelling on a screen (e.g. on the first wall 3.1 of the room 4) from one point to another, the person 1 who listens the sounds by the headset should recognise the movement of the sound of the car (i.e. the sound of the car should "follow" the movement of the car on the screen).

What is mentioned above may be true when the person keeps his/her face directed to the screen i.e. the eyes are directly looking at the screen (the heading angle is substantially constant). When the head is rotated to a different direction, sounds (audible signals) generated by the headset need to be processed to avoid the feeling that the sounds are following the movements of the head. Therefore, changes in the direction the head is facing need to be detected and some kind of correction should be generated to the audible signals so that the person still could sense the context between the source of the audio signal and it's position on the screen. Of course, every audio signal does not have a respective source shown on the screen but the audio signal still has a certain direction from where they are coming from (from the front of a person, from either side, and/or behind). For example, in the above mentioned example the car may not be visible on the screen but the sound can be heard and the direction where the sound seems to be coming can be determined by the person when audible signals generated by the headset are corrected on the basis of the determined direction and/or position of the person's head.

Now, the generation and reception of ultrasonic signals will be described in more detail with reference to FIG. 2. The transmitter 2 generates an ultrasonic signal having a frequency outside of the frequency range of a human ear, i.e. above 20 kHz. For example, the frequency is in the range of 30-50 kHz, but it is obvious that a frequency outside of this frequency range can be used as well. The transmitter 2 comprises a carrier generator 2.1 forming a carrier signal having a desired frequency, e.g. 40 kHz. The waveform of the carrier signal is preferably sine wave but also other waveforms may be used. The transmitter 2 also comprises a modulating signal generator 2.2, which generates a modulating signal. The frequency of the modulating signal is much smaller than the frequency of the carrier signal, for example within the range of 800-1000 Hz. The carrier signal is connected to a first input 2.31 of a mixer 2.3 and the modulating signal is connected to a second input 2.32 of the mixer 2.3. The mixer 2.3 produces a modulated signal which can be connected to the transmitting element 2.4, such as an ultrasonic resonator or another kind of electrical-acoustical transforming element which can produce an ultrasonic sound on the basis of the modulated, electrical signal. If ultrasonic resonator is used, the frequency of the carrier should be about the same than the resonance frequency of the ultrasonic resonator. The modulation can be, for example, amplitude modulation, frequency modulation, or phase modulation. The transmitting element 2.4 transmits the modulated signal (block 401 in FIG. 4).

The modulated ultrasonic sound is received by the first receiving element 9.1 and the second receiving element 9.2 of the receiving device 9 (block 402). The receiving elements 9.1, 9.2 can be ultrasonic resonators similar to the ultrasonic resonator of the transmitter 2, or other acoustic-electrical transforming elements capable of producing an electrical signal on the basis of ultrasonic sound. Electrical signals produced by the first receiving element 9.1 are amplified by a first amplifier 9.3, if necessary, and converted to a first digital signal in a first analogue-to-digital converter (ADC) 9.5. Respectively, electrical signals produced by the second receiving element 9.2 are amplified by a second amplifier 9.4, if necessary, and converted to a second digital signal in a second analogue-to-digital converter (ADC) 9.6. The first digital signal is connected to a first detector 9.7 to demodulate the signal. The first detector 9.7 comprises e.g. a first multiplier 9.7.1, which performs a multiplication operation to the first digital signal, and a first filter 9.7.2, which filters the multiplied signal i.e. the signal formed by the first multiplier. The first detector 9.7 produces a first demodulated signal.

As the first receiving channel 9a and the second receiving channel 9b should be substantially identical, the second digital signal is connected to a second detector 9.8 to demodulate the signal. The second detector 9.8 comprises e.g. a second multiplier 9.8.1 and a second filter 9.8.2 and produces a second demodulated signal.

The first filter 9.7.2 and the second filter 9.8.2 are low-pass filters, band-pass filters, notch filters or other kind of filters which can separate the modulation information from the signal of the multipliers 9.7.1, 9.8.1.

The multipliers 9.7.1, 9.8.1 can be replaced with an absolute value calculation element (not shown), which produces a signal indicative of an absolute value of the input signal. There are also other alternative ways to implement the detectors, which is known to a skilled person.

The first and second demodulated: signals are signals which in ideal circumstances correspond to the modulating signal of the transmitter 2. In practice, there can be some differences between the modulating signal and the demodulated signals due to disturbances in the system, inaccuracies of components of the system, environmental disturbances etc. However, in this invention such inaccuracies do not usually have any significant effect on the demodulated signals.

Because the same signal, although possibly with different phases, are received and demodulated, frequencies of the demodulated signals after the detectors 9.7, 9.8 are substantially the same than the frequency of the modulated signal but they may have a phase difference depending on difference in the distances of the receiving elements 9.1, 9.2 with respect to the transmitting element 2.4 of the transmitter 2.

The first demodulated signal is used as a first analysis signal in the system of the present invention, and, respectively, the second demodulated signal is used as a second analysis signal in the system of the present invention. The first analysis signal is connected to a first input 9.9.1 of a phase detector 9.9 and-the second analysis signal is connected to a second input 9.9.2 of the phase detector 9.9. The phase detector 9.9 produces a signal indicative of phase differences between the first analysis signal and the second analysis signal i.e. a rough estimate of the heading angle (block 403). This indication is directed to an analysing element 11 which performs the object tracking by determining the heading angle of the object 1 (the person's head in FIG. 1) with respect to the transmitter 2.

The signal produced by the phase detector 9.9 is received by the analysing element 11 and analysed to determine among other things the direction of the object with respect to the transmitter 2. In FIG. 2, a non-limiting example of the analysing element 11 is shown. The signal received from the phase detector 9.9 is conducted to a first scaling element 11.1 which scales (multiplies) the input signal by a first scaling factor (l-g). The scaled signal is supplied to a summing element 11.2 to sum the scaled signal with a scaled feedback term. The feedback term is an output signal from an estimate buffer 11.3, which is scaled by a second scaling factor g in a second scaling element 11.4. The output of the summing element 11.2 indicates the angle of the object with respect to the transmitter 2. Output signals from the summing element 11.2 at different moments of time are also supplied to an estimate buffer 11.3 in which the correction term is formed on the basis of information collected in the estimate buffer 11.3. The estimate buffer 11.3 also supplies information to a motion logic and step adjustment element 11.4 to perform adjustments to the first and/or second scaling factors on the basis of detected movements of the object (e.g. changes in the angle of the object). The above described operation of the analysing element 11 is known as an adaptive IIR (infinite impulse response) filtering operation on the angle estimate.

By selecting the first and the second scaling factor the properties of movements of the object can be taken into account. For example, when a person's head is tracked, some assumptions can be made e.g. on the speed of movements. The purpose of the above described filtering (scaling and summing) is also to reduce the effects of noise of the system, reduce the effect of possible erroneous detections (errors in individual phase detections). The selection of the scaling factors is a kind of a compromise between accuracy and speed. When a low-degree (weak) filtering is used, a faster system can be achieved, i.e. the latency is smaller, but the accuracy is also smaller. A high-degree (strong) filtering improves the accuracy but increases the latency. Therefore, the selection is at least partly dependent on the application in which the object tracking according to the present invention will be used.

The analysing element 11 may also be able to adapt the filtering properties to better correspond with different kind of conditions. For example, the accuracy may need to be improved or the latency may need to be decreased from time to time.

The analysing element 11 can also evaluate the reliability of the rough estimate and compare it with one or more previous estimates (block 404). If the rough estimate is evaluated as non-reliable, the compared previous estimate will be used (block 409). If necessary, the compared previous estimate is stored in a memory location reserved for the new (current) estimate (block 410). However, the compared previous estimate is usually the latest approved estimate wherein it has previously been stored in the memory location reserved for the current estimate. Hence, it may not be necessary to store the compared previous estimate again.

In the situation in which the rough estimate was evaluated as reliable, the rough estimate can be compared to one or more previous estimates (block 405) to determine the speed of the movement (e.g. a change in the heading angle) of the object. If the comparison indicates that the movement is slow, the averaging property of the filtering can be increased (block 407) which usually decreases errors in the estimate i.e. makes the estimate more accurate. On the other hand, if the comparison indicates that the movement is fast, the averaging property of the filtering can be decreased (block 406) which usually decreases lag in the estimate i.e. the estimate changes faster and follows the movements of the object faster.

After possible adjustments to filter properties the rough estimate is filtered to form a new estimate (block 408), which is stored into the memory location reserved for the current estimate.

The angle information can now be provided to a controlling element, e.g. to the audio processing device 7, to make any corrective actions needed to the audible signal. For example, the controlling element can delay one of the signals to the electro-acoustic transformers 8.1, 8.2 of the headset with respect to the other signal to the other electro-acoustic transformer 8.1, 8.2 so that the phase difference between these signals changes. The change in the phase difference can be such that it totally or partly compensates changes in the direction of the object 1. Details of the controlling element are not disclosed here because they depend on the application in which the object tracking is used.

Signals after the analogue-to-digital converters 9.4, 9.6 are in digital form. Hence, detectors 9.7, 9.8, the phase detector 9.9 and the analysing element 11 can all be implemented as software i.e. as program instructions which, when executed by a processing element 12, perform the desired signal processing tasks. The processing element 12 can be a digital signal processor, a reduced instruction set processor (RISC), a microprocessor, a micro controller, etc. Some of the operations may also be implemented by logic circuits, for example in an application specific integrated circuit (ASIC).

The first detector 9.7 and the second detector 9.8 can be e.g. envelope detectors when the transmitter 2 is configured to transmit amplitude modulated signal, but other detectors are also applicable.

The elements of the receiving device 9 need not all be implemented in the same physical body but they can be separated in several ways. For example, the electro-acoustic transformers 8.1, 8.2 and the first receiving element 9.1 and the second receiving element 9.2 can be formed as a one body while the other elements of the system are positioned into one or more other bodies. Communication between such separate entities can be formed by many ways in a wired or wireless manner. Some non-limiting examples of wireless communication are optical, acoustic, inductive, and radio frequency (RF) signal transmission and reception.

Figure 5A:
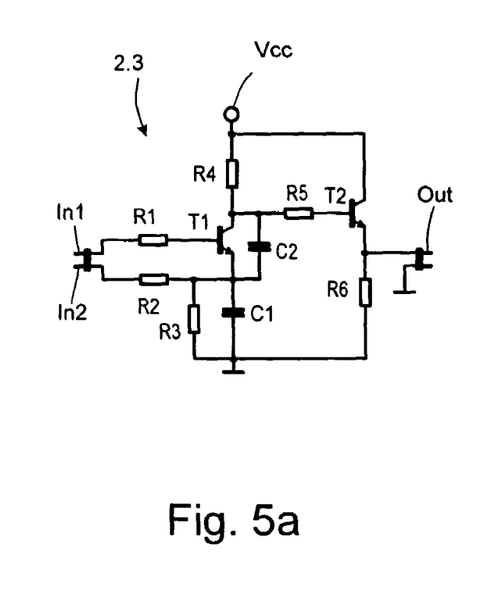
FIG. 5a depicts an example of a mixer for a device for transmitting according to an example embodiment of the present invention as a simplified block diagram.

In FIG. 5a an example embodiment of the mixer 2.3. of the transmitter 2 is shown. The carrier signal generated by the carrier generator 2.1 is input to the first input In1 and the modulating signal generated by the modulating signal generator 2.2 is input to the second input In2. The carrier signal can be e.g. a square wave having a frequency outside of the frequency range of a human ear, i.e. above 20 kHz. For example, the frequency is about 40 kHz, but it is obvious that other frequencies can be used as well. The modulating signal can also be a square wave, for example. The frequency of the modulating signal is much smaller than the frequency of the carrier signal, for example about 1000 Hz. The mixer 2.3 comprises a mixing element T1, such as a transistor. In this embodiment the carrier signal is connected through the resistance R1 to the base of the mixing element T1. The modulating signal is connected through the resistance R2 to the emitter of the mixing element T2. The collector of the mixing element provides the mixing result which is connected through the resistance R5 to the base of the amplifying element T2. The amplifying element can also be a transistor, for example. The amplifying element provides the amplified signal to the output Out from which the amplified signal can be connected to the transmitting element 2.4. The mixer 2.3 further comprises capacitances C1, C2 and other resistances R3, R4, R6 than mentioned above.

Figure 5B:
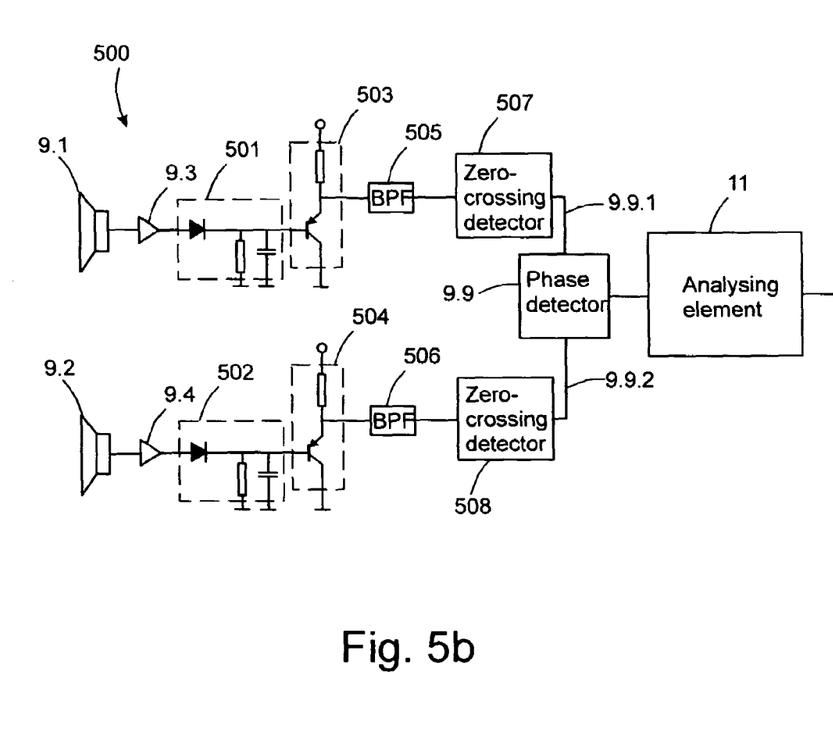
FIG. 5b depicts a device for receiving according to another example embodiment of the present invention as a simplified block diagram.

FIG. 5b depicts another example embodiment of the receiving device 500 in which no analogue-to-digital conversion is needed. The modulated ultrasonic sound is received by the first receiving element 9.1 and the second receiving element 9.2 of the receiving device 500. Electrical signals produced by the first receiving element 9.1 are amplified by a first amplifier 9.3, and, respectively, electrical signals produced by the second receiving element 9.2 are amplified by a second amplifier 9.5. The amplified signals from the first amplifier 9.3 are connected to the first detector 501, and the amplified signals from the second amplifier 9.3 are connected to the second detector 502. The first 501 and the second detector 502 can be, for example, envelope detectors as shown in FIG. 5b, but also other types of analogue detectors can be used as well. The signal from the first detector 501 is connected to a first buffer element 503 and the signal from the second detector 502 is connected to a second buffer element 504. The first 503 and second buffer element 504 are, for example, transistors in a common-collector configuration. Signals passed through the first buffer element 503 are connected to a first band-bass filter 505 and the signals from the second buffer element 503 are connected to a second band-bass filter 506.

The first 505 and the second band-pass filter 506 have the centre frequency near the frequency of the modulating signal, for example about 1 kHz. Then, signals at the pass band of the band-pass filters 505, 506 pass through the of the band-pass filters and signals outside the pass-band are attenuated. The first 505 and the second band-pass filter 506 can have a high amplification ratio wherein the first 505 and the second band-pass filter 506 saturate even with quite a weak input signals.

The purpose of the saturation is to improve the zero-crossing detection sensitivity in the zero-crossing detectors 507, 508. In other words, the signal output by the first band-pass filter 505 is input to the first zero-crossing detector 507 and the signal output by the second band-pass filter 505 is input to the second zero-crossing detector 508.

The first 507 and the second zero-crossing detector 508 detect the moments when the band-pass filtered signals cross the zero-point i.e. when the signal amplitude decreases from a positive value to a negative value and when the signal amplitude increases from a negative value to a positive value (the amplitude changes its sign). These moments indicate the times when the modulating signal changes its value from high to low (e.g. from logical one to logical zero) or from low to high (e.g. from logical zero to logical one). It was mentioned above that the modulating signal is e.g. a square wave wherein zero-crossing detectors 507, 508 form an indication at the moments when the received signal has an edge of the modulating signal. Therefore, if the travelling time of the signal from the transmitting element to the first receiving element 9.1 is different from the travelling time of the signal from the transmitting element to the second receiving element 9.2, the first zero-crossing detector 507 gives the indication at a different time than the zero-crossing detector 508. This difference in time can be used in determining the position of the object to be tracked, as will be explained below.

The output of the first zero-crossing detector 507 is connected to the first input 9.9.1 of the phase detector 9.9. Respectively, the output of the second zero-crossing detector 507 is connected to the second input 9.9.2 of the phase detector 9.9. The phase detector 9 produces a signal indicative of phase differences between the first analysis signal and the second analysis signal. The signal produced by the phase detector 9.9 is received by the analysing element 11 and analysed to determine among other things the direction of the object with respect to the transmitter 2.

Figure 2:
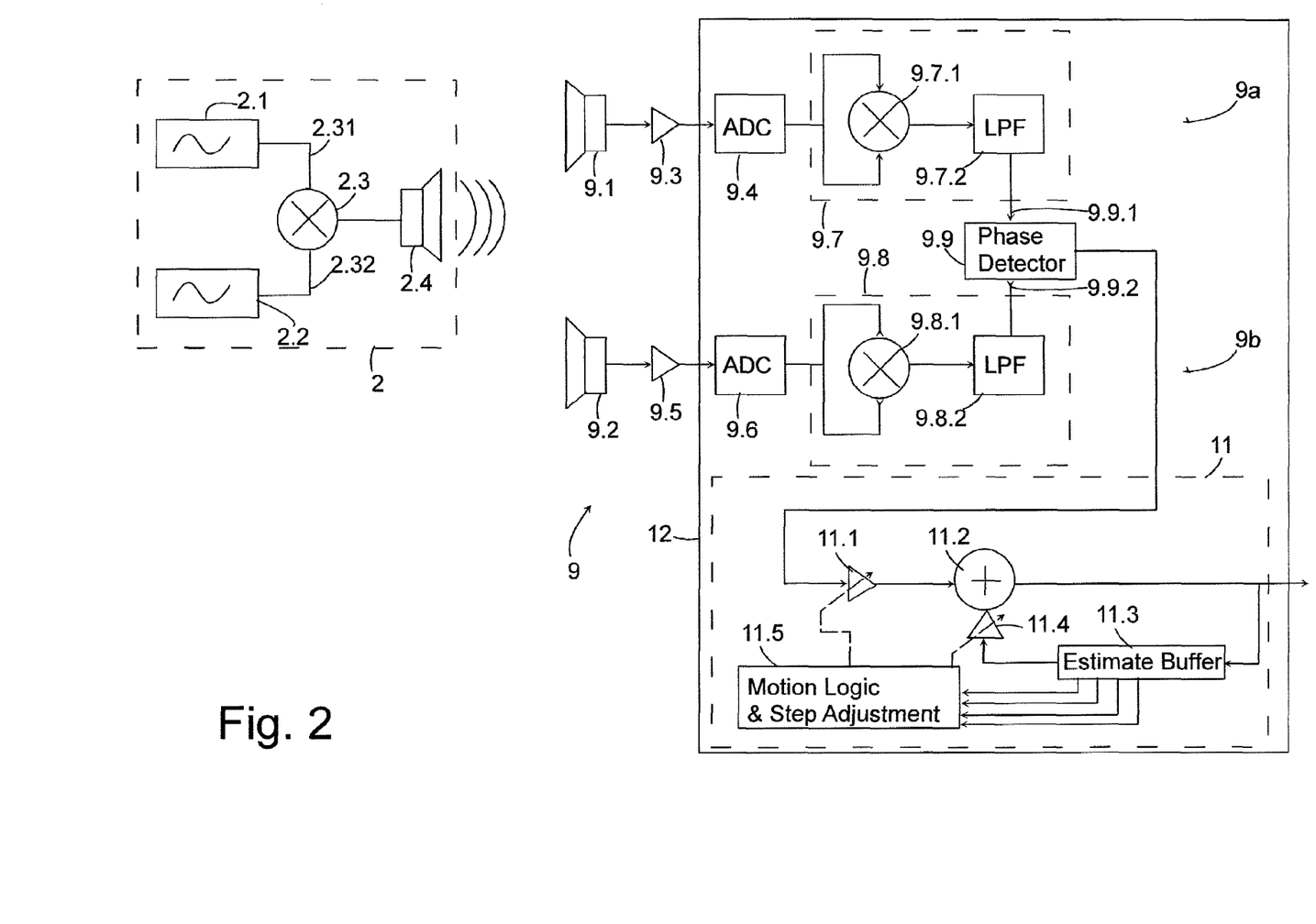
FIG. 2 depicts a system according to an example embodiment of the present invention as a simplified block diagram.

The phase detector 9.9 and the analysing element 11 can be similar to the phase detector 9.9 and the analysing element 11 of the first embodiment depicted in FIG. 2.

In the receiver of FIG. 5b there are a number of resistances and capacitances the purpose of which are not discussed in more detail in this description but an expert in the field can realize the meaning of each of the resistances and capacitances.

Figure 3B:
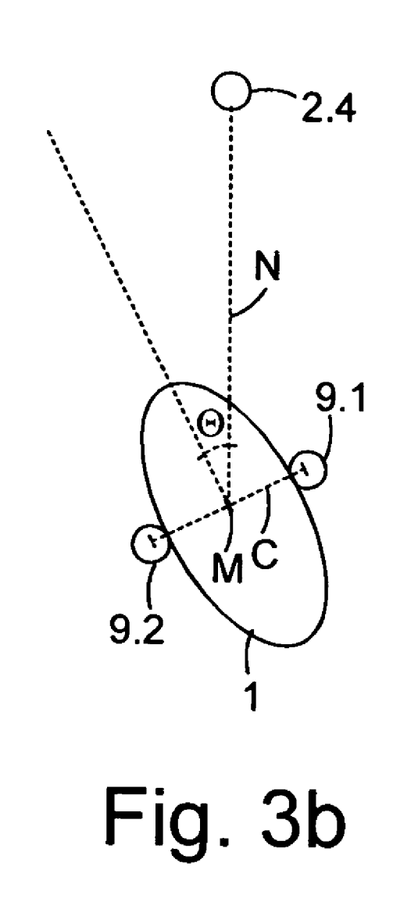
Figure 3C:
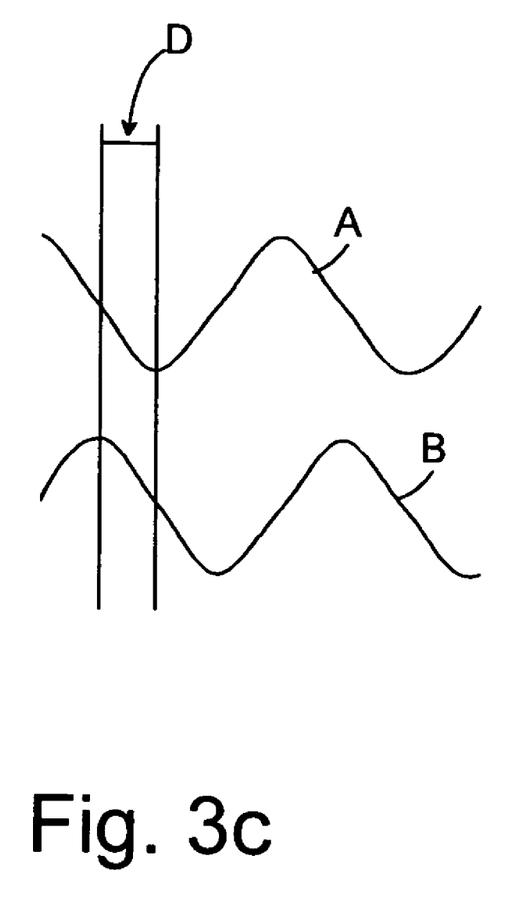

In the following some theory of the operation of the object tracking according to the present invention will be described with reference to FIGS. 3a-3c. As ultrasonic signals are transmitted in air the speed of the signals is about 340 m/s. The first receiving element 9.1 and the second receiving element 9.2 are at a distance s from each other. Maximum value for the distance can be calculated by the following equation:

$$s \leq \left(\frac{\text{speed of the signal}}{\text{modulation frequency}}\right)\bigg/ 2 = \left(\frac{340\,\text{m/s}}{\text{modulation frequency}}\right)\bigg/ 2$$

If, for example, the frequency of the modulating signal is 800 Hz, the maximum distance is 0.21 m. The speed of the signal is assumed to be about 340 m/s when the signal propagates in air.

The locations of the transmitter 2 (in fact, the location of the transmitting element 2.4), the first receiving element 9.1 and the second receiving element 9.2 define a fictitious level (three points define a level). The direction of the object 1 with respect of the transmitter 2 can be regarded as a normal (marked with the letter N in FIGS. 3a and 3b) to a (fictitious) line (marked with the letter C in FIGS. 3a and 3b) between the first receiving element 9.1 and the second receiving element 9.2. The angle θ is the angle between the normal N and the line from a mid point of the line C to the transmitting element 2.4 (marked with the letter M in FIGS. 3*a* and 3*b*).

Because only one transmitter 2 is required and the receiving elements 9.1, 9.2 receive the same signal (a signal transmitted at a same time although the signal paths are different) there is no need to inform the receiver 9 the transmission times of the signal. When both receiving elements are at the same distance from the transmitter (FIG. 3*a*), it is assumed that the object 1 is directly facing the transmitter 2. It can be defined that the directional angle θ is 0 degrees. When the object 1 is rotated the directional angle θ changes and the distance from the transmitter 2 to the first receiving element 9.1 becomes different from the distance from the transmitter 2 to the second receiving element 9.2 (FIG. 3*b*). Therefore, the first receiving element 9.1 receives the same signal transmitted from the transmitter 2 at a different time than the second receiving element 9.2. Using the notifications of FIGS. 3*b* the first receiving element 9.1 (depicted on the right side of the object 1) is nearer the transmitter 2 than the second receiving element 9.2. Hence, the phase of the signal generated by the first receiving element 9.1 on the basis of received signal advances the phase of the signal generated by the second receiving element 9.2 on the basis of the received signal. This phase difference D is illustrated in FIG. 3*c* in which A denotes the signal of the first receiving element and B denotes the signal of the second receiving element. The phase difference D is the bigger the larger is the difference in distances between the receiving elements 9.1, 9.2 and the transmitter 2 8. Larger difference in distance also means a greater angle value θ.

The absolute distances between the transmitter 2 and the receiving elements 9.1, 9.2 do not have any significant effect to the phase difference. Therefore, the operation of the phase detection is basically not dependent on how far or near the object is from the transmitter 2. Of course, in practice there are some limits to the distance (minimum and maximum distance) but they are also dependent on details of the application in which the invention will be applied.

The object 1 can also be rotated at a plane different from the above defined plane. For example, the person may nod his/her head or turn it sideways. In these situations the difference between distances from the transmitter 2 to the receiving elements 9.1, 9.2 may not change. Therefore, if it is also necessary to detect such changes, a third receiving element and/or a second transmitter (not shown) may be needed. Still, the operation principles remain the same i.e. using a modulated ultrasonic sound and detecting phase differences in received ultrasonic sound signals.

Two or more transmitters positioned in different locations in a room may also be needed if a two- or three-dimensional tracking is needed. In this case each transmitter could use a different modulating frequency and the receiver could have different receiving paths designed to demodulate signals having different modulation frequencies.

In the above description it was assumed that the object tracking is performed for making corrections to audible signals generated by the headset. The invention can also be used in connection with other kinds of applications in which object tracking may be needed. For example, the angle information can be used to control movements of a cursor on a screen. The person may turn his/her head to make the cursor move. If two- or three dimensional detection is used, the person can also activate some other actions e.g. by nodding the head. Therefore, the system of the invention could be used as a pointing device (a mouse) of a computer, for example.

The object to be tracked need not be a person's head. For example, the object can be a device the direction of which should be tracked such as a camera, an animal in a testing environment, etc.

It should be mentioned here that there can be more than one receiver which perform object tracking on the basis of the same transmitter 2. The receivers do not significantly disturb each other and they can operate without any physical or logical connection between each other or the transmitter. Further, there is no need to transmit any other information from the transmitter 2 than the modulated ultrasonic signal.

In some circumstances echoes e.g. from the walls 3.1-3.3 of the room may affect the operation of the system. Hence, it may be necessary to improve the directionality of the transmitting element 2.4 and/or the receiving elements 9.1, 9.2, or a corrective action could be implemented in the analysing element 11.

The invention claimed is:

1. A receiver for receiving an amplitude modulated ultrasonic signal from a transmitter to form an analysis signal on the basis of the received amplitude modulated signal; the receiver comprising:
   a first receiving element for receiving the amplitude modulated ultrasonic signal from a transmitter to form a first demodulated analysis signal on the basis of the received signal;
   a second receiving element for receiving the amplitude modulated ultrasonic signal from the transmitter to form a second demodulated analysis signal on the basis of the received signal;
   a phase detector for providing an indication on the basis of a phase difference between said first and second demodulated analysis signals; and
   an analyzing element for analyzing said indication to determine a heading angle of an object operatively connected to the receiver, wherein said analyzing element comprises a first scaling element, a second scaling element, an input for inputting said indication, and a control element to adjust scaling parameters of the first scaling element and a second scaling element.

2. The receiver according to claim 1, wherein said analyzing element further comprises
   a memory for storing one or more estimates of the heading angle of the object, wherein said analyzing element is adapted to use said indication and at least one of said one or more estimates in determining a reliability of the indication.

3. The receiver according to claim 1, wherein
   said first receiving element comprises a first detector for demodulating the received signal to form said first demodulated analysis signal; and
   said second receiving element comprises a second detector for demodulating the received signal to form said second demodulated analysis signal.

4. The receiver according to claim 1, wherein said first receiving element and said second receiving element are attached in connection with a headset comprising electro-acoustic transformers.

5. An object tracking device comprising:
   a first receiving element for receiving an amplitude modulated ultrasonic signal from a transmitter to form a first demodulated analysis signal on the basis of the received signal;
   a second receiving element for receiving the amplitude modulated ultrasonic signal from the transmitter to form a second demodulated analysis signal on the basis of the received signal;
   a detector for providing an indication on the basis of a phase difference between said first and second demodulated analysis signals; and
   an analyzing element for analyzing said indication to determine a heading angle of an object operatively connected to the tracking device, wherein said analyzing element comprises a first scaling element, a second scaling element, an input for inputting said indication, and a control element to adjust scaling parameters of the first scaling element and a second scaling element.

6. A system comprising:
a transmitter for transmitting an amplitude modulated ultrasonic signal;
a receiver for receiving the amplitude modulated ultrasonic signal transmitted from the transmitter to form an analysis signal on the basis of the received signal, wherein said receiver comprises
   a first receiving element for receiving the amplitude modulated ultrasonic signal from a transmitter to form a first demodulated analysis signal on the basis of the received signal;
   a second receiving element for receiving the amplitude modulated ultrasonic signal from the transmitter to form a second demodulated analysis signal on the basis of the received signal; and
   a phase detector for providing an indication on the basis of a phase difference between said first and second analysis signals;
an analyzing element for analyzing said first and second demodulated analysis signals to determine a heading angle of an object operatively connected to the receiver, wherein said analyzing element is configured to use said indication in the analysis to determine the heading angle of the object, wherein said analyzing element comprises a first scaling element, a second scaling element, an input for inputting said indication, and a control element to adjust scaling parameters of the first scaling element and a second scaling element.

7. The system according to claim 6, wherein said analyzing element further comprises
   a memory for storing one or more estimates of the heading angle of the object, wherein said analyzing element is adapted to use said indication and at least one of said one or more estimates in determining a reliability of the indication.

8. The system according to claim 6, wherein
said first receiving element comprises a first detector for demodulating the received signal to form said first demodulated analysis signal; and
said second receiving element comprises a second detector for demodulating the received signal to form said second demodulated analysis signal.

9. The system according to claim 6, wherein said amplitude modulated ultrasonic signal comprises a carrier wave having a first frequency, said carrier wave having been modulated by a modulating signal having a second frequency.

10. The system according to claim 9, wherein said second frequency is more than one decade lower that said first frequency.

11. The system according to claim 10, wherein said first frequency is within a range of 30-50 kHz, and said second frequency is within a range of 800-1000 Hz.

12. The system according to claim 6, further comprising
a second transmitter for transmitting a second amplitude modulated ultrasonic signal, wherein said receiver is further configured to receive said second amplitude modulated ultrasonic signal.

13. The system according to claim 6, further comprising a second receiver configured to receive said amplitude modulated ultrasonic signal and to determine a heading angle of another object.

14. A method for tracking an object comprising:
transmitting an amplitude modulated ultrasonic signal from a transmitter;
receiving said amplitude modulated ultrasonic signal with a receiver;
demodulating said amplitude modulated ultrasonic signal to form a first demodulated analysis signal on the basis of the received signal;
demodulating said amplitude modulated ultrasonic signal to form a second demodulated analysis signal on the basis of the received signal;
examining said first and second demodulated analysis signals to provide an indication based on a phase difference between said first and second demodulated analysis signals; and
analyzing said indication to determine a heading angle of the object, said analyzing comprising
forming a first scaling parameter,
forming a second scaling parameter,
forming a rough estimate on the basis of said indication on the phase difference,
comparing said rough estimate to one or more previous estimates to determine the reliability of said indication, and
adjusting said first scaling parameter and said second scaling parameter on the basis of the first scaling element and a second scaling element, if said comparing indicates that said indication is reliable.

15. The method according to claim 14, further comprising
storing said indication as a current indication of the heading angle, if said indication was determined reliable.

16. The method according to claim 14, wherein said transmitting comprises
modulating a carrier wave having a first frequency by a modulating signal having a second frequency.

17. A system comprising:
a transmitter for transmitting an amplitude modulated ultrasonic signal comprising a carrier wave having a first frequency, said carrier wave having been modulated by a modulating signal having a second frequency;
a receiver for receiving the amplitude modulated ultrasonic signal transmitted from the transmitter to form an analysis signal on the basis of the received signal, wherein said receiver comprises
   a first receiving element for receiving the amplitude modulated ultrasonic signal from a transmitter to form a first demodulated analysis signal on the basis of the received signal;
   a second receiving element for receiving the amplitude modulated ultrasonic signal from the transmitter to form a second demodulated analysis signal on the basis of the received signal; and
   a phase detector for providing an indication on the basis of a phase difference between said first and second analysis signals;
an analyzing element for analyzing said first and second demodulated analysis signals to determine a heading angle of an object operatively connected to the receiver, wherein said analyzing element is configured to use said indication in the analysis to determine the heading angle of the object.

18. The system according to claim 17, wherein said second frequency is more than one decade lower that said first frequency.

19. The system according to claim 18, wherein said first frequency is within a range of 30-50 kHz, and said second frequency is within a range of 800-1000 Hz.

* * * * *